US006672108B2

(12) United States Patent
Landa et al.

(10) Patent No.: US 6,672,108 B2
(45) Date of Patent: Jan. 6, 2004

(54) METHOD OF MAKING GLASS WITH REDUCED SE BURNOFF

(75) Inventors: Ksenia A. Landa, Grosse Ile, MI (US); Leonid Landa, Grosse Ile, MI (US); Anthony V. Longobardo, Howell, MI (US); Scott V. Thomsen, Milford, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 391 days.

(21) Appl. No.: 09/842,314

(22) Filed: Apr. 26, 2001

(65) Prior Publication Data

US 2003/0078155 A1 Apr. 24, 2003

(51) Int. Cl.$^7$ ................................................ C03B 5/225
(52) U.S. Cl. ...................................... 65/134.3; 65/134.1
(58) Field of Search ............................. 65/134.1, 134.3, 65/134.8, 135.9

(56) References Cited

U.S. PATENT DOCUMENTS

| | | |
|---|---|---|
| 2,309,070 A | 1/1943 | Austin et al. |
| 2,382,282 A | 6/1945 | Austin et al. |
| 2,414,413 A | 1/1947 | Pavlish et al. |
| 2,524,719 A | 10/1950 | Tillyer |
| 3,024,121 A | 3/1962 | Hagedorn |
| 3,121,628 A | 2/1964 | Loehrke |
| 3,628,932 A | 12/1971 | Inoue |
| 3,663,474 A | 5/1972 | Lee et al. |
| 3,768,990 A * | 10/1973 | Sellers et al. .................. 65/17.5 |
| 4,873,206 A | 10/1989 | Jones |
| 4,873,207 A | 10/1989 | Keller, Jr. |
| 5,006,144 A * | 4/1991 | Knavish et al. ............. 65/134.3 |
| 5,023,210 A | 6/1991 | Krumwiede et al. |
| 5,214,008 A | 5/1993 | Beckwith et al. |
| 5,278,108 A | 1/1994 | Cheng et al. |
| 5,308,805 A | 5/1994 | Baker et al. |
| 5,318,931 A | 6/1994 | Nakaguchi et al. |
| 5,346,867 A | 9/1994 | Jones et al. |
| 5,352,640 A | 10/1994 | Combes et al. |
| 5,364,820 A | 11/1994 | Morimoto et al. |
| 5,385,593 A * | 1/1995 | Longobardo ................. 65/17.1 |
| 5,393,593 A | 2/1995 | Gulotta et al. |
| 5,411,922 A | 5/1995 | Jones |
| 5,545,596 A | 8/1996 | Alvarez Casariego et al. |
| 5,877,103 A * | 3/1999 | Dupont et al. ............... 501/171 |
| 5,932,502 A | 8/1999 | Longobardo et al. |
| 5,952,255 A | 9/1999 | Seto et al. |
| 5,998,316 A | 12/1999 | Seto et al. |
| 6,235,666 B1 | 5/2001 | Cochran et al. |
| 6,274,523 B1 | 8/2001 | Krumwiede et al. |
| 6,287,998 B1 | 9/2001 | Seto et al. |
| 6,376,403 B1 | 4/2002 | Koyama et al. |
| 6,408,650 B1 | 6/2002 | Boulos et al. |
| 6,521,558 B2 * | 2/2003 | Thomsen et al. .............. 501/64 |
| 2001/0006927 A1 | 7/2001 | Cochran et al. |
| 2002/0049128 A1 | 4/2002 | Koyama et al. |
| 2002/0058579 A1 | 5/2002 | Seto et al. |

FOREIGN PATENT DOCUMENTS

| | | |
|---|---|---|
| DE | 196 36 303 A1 | 3/1997 |
| EP | 0 536 049 A1 | 4/1993 |
| EP | 0 816 296 A1 | 1/1998 |
| EP | 0 825 156 A1 | 2/1998 |
| EP | 1 078 889 A1 | 2/2001 |
| EP | 0 653 386 | 5/2001 |
| EP | 1 201 615 | 5/2002 |
| WO | WO 96/07621 | 3/1996 |
| WO | WO 99/29634 | 6/1999 |
| WO | WO 01/17920 | 3/2001 |
| WO | WO 01/58820 | 8/2001 |

OTHER PUBLICATIONS

"High Pure Glass Produce Optical Fibre Meter Mix Concentrate Raw Material Close System", XP–002212062 (Jan. 8, 1979).

"Raw Glass Material Flue Gas Dust", XP–002212063 (May 15, 1975).

EPO Search Report (Sep. 18, 2002).

* cited by examiner

Primary Examiner—Sean Vincent
(74) Attorney, Agent, or Firm—Nixon & Vanderhye P.C.

(57) ABSTRACT

A method of making glass (e.g., grey in color in some embodiments, or otherwise colored in other embodiments) in a manner so as to reduce selenium (Se) burnoff. In some embodiments, Epsom salt(s) is added to the glass batch in order to reduce Se burnoff. The resulting glass product is useful, for example, in vehicle and/or architectural privacy glass applications.

25 Claims, No Drawings

METHOD OF MAKING GLASS WITH REDUCED SE BURNOFF

This invention relates to a method of making glass (e.g., grey or dark in color) using a technique where selenium (Se) burnoff is reduced during the process of manufacture so as to reduce pollution. The resulting glass compositions are thus useful, for example, in vehicle windows and/or architectural applications.

BACKGROUND OF THE INVENTION

Privacy windows for use in automobiles and/or architectural applications are becoming more popular, as is demand for grey glass in general. These glasses are typically based upon a standard soda-lime-silica glass composition (used to make float glass) to which is added various colorants to attain the desired coloring and spectral properties. Iron, typically including both ferric ($Fe^{3+}$) and ferrous ($Fe^{2+}$) iron, is often used in such glasses. Ferric iron is a strong ultraviolet (UV) absorber and yellow/green colorant while ferrous iron is a known infrared (IR) absorber and blue colorant. Other colorants which are often used in such glasses include Se, Co, Cr, Mn, V, Ce, Ti, Mo, and the like.

Commonly owned U.S. Pat. No. 5,932,502 (hereby incorporated herein by reference) discloses a dark grey privacy glass composition including a colorant portion of $Fe_2O_3$ (total iron), $Co_3O_4$, Se, and $Cr_2O_3$. The resulting glass of the '502 patent has good coloring and spectral characteristics.

Unfortunately, when making the glass of the '502 patent a large percentage of the Se originally added to the batch burns off during the process of glass manufacture (i.e., a high rate of Se burnoff is experienced). Se is a known pollutant, and high rates of Se burnoff are thus undesirable for environmental reasons. For example, when making glass according to the '502 patent commercially, about 0.1000% (wt. %) metallic Se is originally provided in the batch along with about 1.0% salt cake which is used as a refining agent. After the batch is melted and processed, the resulting glass has only about 0.0026–0.0028% Se left therein (the rest of the Se has burned off). This translates into a Se retention of less than 10% (i.e., at least about 90% of the Se originally present in the batch burns off during the process of manufacture). This high rate/percentage of Se burnoff is undesirable.

U.S. Pat. No. 5,346,867 discusses the problem of Se vaporization. In response to the problem, the '867 patent uses manganese oxide in order to decrease Se burnoff. Unfortunately, the $MnO_2$ technique used in the '867 patent only enables up to 22.3% of the originally presented Se to be retained (see Table III in the '867 patent).

In view of the above, it will be apparent to those skilled in the art that there exists a need in the art for a method of making Se-inclusive glass wherein the rate and/or percentage of Se burnoff during the process of glass manufacture can be reduced and/or minimized.

SUMMARY OF THE INVENTION

An object of this invention is to provide a method of making a selenium (Se) inclusive glass in a manner such that Se burnoff during the process of manufacture is reduced. This method may be applied to grey colored glass in certain embodiments of this invention, as well as to other colored glasses in other embodiments of this invention.

Another object of this invention is to reduce Se burnoff in a process of glass manufacture by using Epsom salt(s) (e.g., $MgSO_4 \times 7H_2O$) as a refining agent and/or melting aide. Surprisingly, it has been found that the use of Epsom salt(s) (e.g., instead of and/or in addition to salt cake or the like) as a batch component enables more Se to be retained (i.e., less Se burnoff).

Another object is to fulfill one or more of the above-listed objects and/or needs.

Generally speaking, this invention fulfills one or more of the above-listed objects or needs by providing a method of making glass, the method comprising:

processing a molten glass batch including Se in order to form a resulting glass product comprising SiO2 and Se, in a manner so that the resulting glass product retains at least 30% of the Se originally present prior to melting.

In other embodiments of this invention, one or more of the above-listed needs and/or objects is/are fulfilled by providing a method of making glass, the method comprising:

providing a glass batch including SiO2, Fe2O3, Epsom salt, and an original amount of Se; and forming a resulting glass product from the glass batch in a manner such that the resulting glass product includes at least 30% of the original amount of Se due at least to the presence of a sufficient quantity of the Epsom salt in the batch.

In certain other embodiments of this invention, one or more of the above-listed needs or objects is fulfilled by providing a method of making a grey colored glass, the method comprising:

providing a molten glass batch comprising SiO2, Se, and Epsom salt;

processing the glass batch in order to make a resulting grey colored glass product, the grey colored glass product including a base glass portion comprising:

| Ingredient | wt. % |
| --- | --- |
| $SiO_2$ | 67–75% |
| $Na_2O$ | 10–20% |
| CaO | 5–15% |
| MgO | 0–5% |
| $Al_2O_3$ | 0–5% |
| $K_2O$ | 0–5% |
| BaO | 0–1% | and a colorant portion comprising:

| Ingredient | Amount |
| --- | --- |
| Total iron (expressed as $Fe_2O_3$): | 1.0 to 2.2% (wt. %) |
| selenium (Se): | 10 to 50 ppm |
| cobalt oxide: | 0.015 to 0.040% |
| titanium oxide: | 0 to 3.5% |
| chromium oxide: | 0 to 0.03%; and | wherein the Epsom salt is provided in the glass batch in sufficient quantity so that the resulting glass product retains at least 30% of the Se originally present in the batch.

Certain other embodiments of this invention fulfill a desired need by providing a grey colored glass comprising:

a base portion and a colorant portion;

said base portion of the glass comprising:

| Ingredient | wt. % |
|---|---|
| $SiO_2$ | 67–75% |
| $Na_2O$ | 10–20% |
| CaO | 5–15% |
| MgO | 0–5% |
| $Al_2O_3$ | 0–5% |
| $K_2O$ | 0–5% |
| BaO | 0–1% | and said colorant portion consisting essentially of:

| Ingredient | Amount |
|---|---|
| Total iron (expressed as $Fe_2O_3$): | 1.4 to 1.8% (wt. %) |
| selenium (Se): | 10 to 50 ppm |
| cobalt oxide: | 0.015 to 0.040% |
| titanium oxide: | 0.2 to 3.5% |
| chromium oxide: | 0 to 0.03%; and | wherein the glass is grey in color and has a dominant wavelength in the range of from 435 nm to 570 nm, is substantially free of manganese dioxide, and is substantially free of nickel.

DETAILED DESCRIPTION OF CERTAIN EMBODIMENTS OF THIS INVENTION

Glasses (e.g., colored grey or any other suitable color) according to different embodiments of this invention may be used, for example, in the automotive industry (e.g., windshields, backlites, side windows, etc.), in architectural applications, and/or in other suitable applications. Resulting glass products herein may be from about 1–12 mm thick in different embodiments.

Certain glasses according to this invention utilize soda-lime-silica flat glass as their base composition/glass, to which is added certain ingredients making up a colorant portion. An exemplary soda-lime-silica base glass according to certain embodiments of this invention, on a weight percentage (wt. %) basis, includes the following basic ingredients:

TABLE 1

EXEMPLARY BASE GLASS

| Ingredient | Wt. % |
|---|---|
| $SiO_2$ | 67–75% |
| $Na_2O$ | 10–20% |
| CaO | 5–15% |
| MgO | 0–5% |
| $Al_2O_3$ | 0–5% |
| $K_2O$ | 0–5% |
| BaO | 0–1% |
| $B_2O_3$ | 0–5% |

In certain embodiments, for example, glass herein may be made from batch raw materials silica sand, soda ash, dolomite, limestone, with the use of at least Epsom salt(s) as refining agent and/or melting aide. Other minor ingredients, including various conventional refining aids may also be included in the base glass. Additionally, in certain embodiments a spectral modifier such as sodium phosphate ($Na_2HPO_4$) in an amount of from 0 to 2.0%, more preferably from 0 to 1.5%, may be added to the batch for color adjustment purposes. Sodium phosphate, while a color modifier, is not defined as a "colorant" herein.

As explained in more detail below, the use of Epsom salts (e.g., $MgSO_4 \times 7H_2O$) in the process of glass manufacture has surprisingly been found to reduce Se burnoff during the manufacturing process (e.g., conventional melt and float processing). This reduction in selenium (Se) burnoff is significant in that it both reduces pollution and/or reduces the amount of costly Se that has to be added to the glass batch prior to or during the melt in order to end up with the same amount of Se in the resulting glass composition.

Reducing agent(s) such as Si (metallic), Si, silicon monoxide, SiO, sucrose, and/or carbon may also be used. In other embodiments of this invention, no reducing agent is needed due to the rather high iron content to be discussed more fully below. In certain embodiments of this invention soda-lime-silica based glasses include by weight from about 10–15% $Na_2O$ and from about 6–12% CaO. While a soda-lime-silica base glass set forth above is preferred in certain embodiments of this invention, this invention is not so limited. Thus, other base glasses (e.g., borosilicate glass) may instead be employed in alternative embodiments.

In one example embodiment of this invention, to the base glass (e.g., see Table 1 above) a colorant portion is added which causes the resulting glass to be grey in color (i.e., dominant wavelength of from 435 nm to 570 nm). In this embodiment, the resulting grey glass has a dominant wavelength of from 480 nm –560 nm (nanometers), and an excitation purity (Pe) no greater than 11%, more preferably no greater than 8%, and most preferably from 1 to 7%. In this embodiment, an exemplary colorant portion that is added to the base glass is substantially free of cerium, manganese dioxide, and/or nickel (i.e., no more than 0.0030% Ce, CeO, and/or $CeO_2$, no more than 0.0030% Mn or $MnO_2$, and/or no more than 0.0010% Ni and/or NiO), and is characterized as set forth in Table 2 below (in terms of weight percentage of the total glass composition):

TABLE 2

COLORANT PORTION ADDED TO BASE GLASS BATCH IN EXAMPLE GREY GLASS EMBODIMENT

| Ingredient | (Preferred) | (More Preferred) |
|---|---|---|
| Total iron (expressed as $Fe_2O_3$): | 1.0 to 2.2% (wt. %) | 1.2 to 1.8% |
| selenium (Se) (metallic form): | 30 to 90 ppm | 40–80 ppm |
| [or if Se added as $Na_2SeO_3$]: | 70 to 180 ppm | 90–160 ppm |
| cobalt oxide (e.g., $Co_3O_4$): | 0.015 to 0.040% | 0.018 to 0.030% |
| titanium oxide (e.g., $TiO_2$): | 0 to 3.5% | 0.1 to 2.6% |
| chromium oxide (e.g., $Cr_2O_3$): | 0 to 80 ppm | 5–20 ppm |

In certain embodiments of this invention, the colorant portion is substantially free of other colorants (other than potentially trace amounts). As can be seen above, the colorant portion may also be substantially free of chromium oxide, phosphates, and/or titanium oxide in certain embodiments of this invention. However, in other embodiments chromium oxide may be used to affect color. In certain embodiments, the colorant portion consists essentially of the colorants listed in Table 2 above, while in other embodiments the colorant portion simply comprises or includes the colorants listed in Table 2 above. However, it should be appreciated that small amounts of other materials (e.g., refining aids, melting aids, and/or impurities) may be present in the glass such as manganese, molybdenum, tin, chlorine, zinc, zirconium, Si, sulfur, fluorine, lithium and strontium, without taking away from the purpose(s) and/or goal(s) of the grey glass embodiment of the instant invention. Those of skill in the art will recognized that the aforesaid colorant portion is provided for purposes of example only, and certain embodiments of the instant invention are not so limited.

In preferred embodiments of this invention, Epsom salt(s) (e.g., $MgSO_4 \times 7H2O$) is added to the batch (e.g., including the base glass and colorant portion in Tables 1 and 2 above) prior and/or during the melt in order to reduce Se burnoff. In one example embodiment of this invention, from about 0.1 to 2.0% (wt. %) Epsom salt(s) is added to the batch, and in more preferred embodiments from about 0.2 to 1.5% Epsom salt(s) is added to the batch. As a result of the addition of Epsom salt(s) to the batch, at least about 30% of the original Se added to the batch is retained in the final glass composition, more preferably at least about 40% of the original Se added to the batch is retained in the final glass composition, and most preferably at least about 50% of the original Se added to the batch is retained in the final glass composition. Another advantage associated with Epsom salts is that they do not require a reducing agent to be used in conjunction therewith (although one may be used), which again can help reduce Se burnoff.

Selenium (Se) may be added to the batch in a variety of different forms in different embodiments of this invention. For example, Se may be added to the batch in the form of sodium and/or calcium selenites, iron and/or cobalt selenides, metallic Se powder, or in any other suitable manner. Example Se powder amounts and sodium selenite amounts are shown above in Table 2. While Se often combines with iron as iron selenide (FeSe) in glass to produce brown color, and does so in certain embodiments of this invention, selenium is referred to in the colorant portion herein as "Se" which is meant to include, for example, its state as Se as well as its other state(s) in glass such as FeSe (and all Se valence states). For example, Se may exist in the form of selenates, selenides, selenites, polyselenides, and/or in elemental form.

Referring to Table 2 above for example, in more preferred embodiments of this invention Se can be added to the batch as a colorant in either (a) the form of metallic Se powder, and/or (b) the form of $Na_2SeO_3$. If added in the form of metallic Se powder, from about 30–90 ppm (parts-per-million) is added to the batch. However, if added in the form of $Na_2SeO_3$, then from about 70–180 ppm of $Na_2SeO_3$ is added. As will be appreciated by those skilled in the art, 60 ppm Se metallic powder has about the same amount of Se as does 144 ppm $Na_2SeO_3$. A combination of Se metallic powder and $Na_2SeO_3$ may be added in alternative embodiments of this invention. As can be seen from the chart/table below, the addition of Se in the form of $Na_2SeO_3$ helps Se retention even more in certain embodiments of this invention.

Regarding cobalt (Co), this blue colorant may be added to the glass batch in the amounts set forth in Table 2 above in certain example embodiments. Moreover, it is believed that much of the cobalt in the glass is in the oxide state of $Co_3O_4$. However, other oxide states of CoO are also possible in glasses according to this invention. Thus, unless expressly stated to the contrary, the terms "CoO" and "$Co_3O_4$" as used herein include not only cobalt in this/these particular oxide state(s), but also include(s) cobalt which may be present in other oxidation state(s).

The total amount of iron present in the glass is expressed herein in terms of $Fe_2O_3$ in accordance with standard practice. This, however, does not imply that all iron is actually in the from of $Fe_2O_3$. Likewise, the amount of iron in the ferrous state is reported herein as FeO, even though all ferrous state iron in the glass may not be in the form of FeO. The proportion of the total iron in the ferrous state (i.e., FeO) is used to determine the redox state of the glass, and is expressed as the ratio $FeO/Fe_2O_3$ which is the weight percentage (%) of iron in the ferrous state (expressed as FeO) divided by the weight percentage (%) of total iron (expressed as $Fe_2O_3$). Thus, $Fe_2O_3$ herein means total iron and FeO means iron in the ferrous state. According to certain embodiments of this invention, the colorant portion of the glass composition herein is characterized by a redox value (i.e., $FeO/Fe_2O_3$) of from 0.20 to 0.30, more preferably from 0.23 to 0.27.

Optionally, titanium oxide may be used in certain embodiments of this invention to increase IR absorption. Moreover, the use of titanium oxide may enable the reduction and/or elimination of chromium oxide from the composition. Additionally, it is believed that the titanium oxide may also help retain Se in the glass (i.e., reduce Se burnoff) by causing it to be more evenly distributed throughout the melt.

It is noted that glass according to this invention is often made via the known float processing in which a tin bath is utilized. It will thus be appreciated by those skilled in the art that as a result of forming the glass on molten tin in certain exemplary embodiments, small amounts of tin or tin oxide may migrate into surface areas of the glass on the side that was in contact with the tin bath during manufacture (i.e., typically, float glass may have a tin oxide concentration of 0.05% or more (wt.) in the first few microns below the surface that was in contact with the tin bath).

When used in the automotive market, grey glasses according to certain embodiments of this invention (e.g., at about 4 mm thickness for purposes of reference) may have an Lta (visible transmission, Ill. A, 2 degree observer) of from 10–30%, more preferably from 12–24%, most preferably from 13–20%; an IR transmission percentage (%) of from 3–28%, more preferably from 4–24%, and most preferably from 8–21%. With regard to transmissive color, these grey glasses according to certain embodiments of this invention may have an a* value (Ill. D65, 10 degree observer) of from 0.0 to −10.0, more preferably from −2.0 to −8.0, and most preferably from −3.0 to −7.0; and a b* value (Ill. D65, 10 degree observer) of from −4.0 to +10.0, more preferably from 0 to +9.0, and most preferably from +2.0 to +8.0. Herein, transmissive Lta is measured in terms of Ill. A, 2 degree observer, while a* and b* color values are measured in terms of Ill. D65, 10 degree observer.

The above-listed colorant portion(s) data and base glass data are for purposes of example only, and the instant invention is not so limited. Instead, one focus of the instant invention is the reduction of Se burnoff during the glass manufacture process, and the use of Epsom salts in a Se inclusive batch may be used in accordance with this invention in combination with base glasses and/or colorant portions other than those discussed above.

EXAMPLES

Certain grey colored privacy glasses according to example embodiments of this invention were made using the following base glass batch (note: the below-listed ingredients in the batch will add up to 100% by weight once oxides thereof are accounted for; thus, they need not add up to one hundred as raw materials):

| Batch Ingredient for Base Glass | Parts by Wt. % |
|---|---|
| sand ($SiO_2$) | 71.5 |
| soda ash ($Na_2CO_3$) | 23.7 |
| dolomite ($CaCO_3$, $MgCO_3$) | 18.32 |
| limestone ($CaCO_3$) | 6.1 |

In addition to the base glass materials above, the Epsom salt(s) and colorant portions added to the original base batch for Examples 1–13 are set forth below in Table 3 along with resulting solar characteristics. Moreover, the amount (ppm) and percentage of originally added Se retained in the final glass product (after the melt and processing) is listed in Table 3 below. The spectral properties in Table 3 (e.g., Lta, IR transmission, transmissive a*, transmissive b*) are also for the final glass product. For each of the examples, final glass products were about 4.09 mm thick sheets. It is also noted that Examples 3–5, 7, and 9–13 were subject to a fritting procedure where the glass melt was poured into water, crushed and re-melted; which typically increases loss of Se and decreases FeO % in the redox. As for the method of adding Se to the original glass batch, it is noted that, for example, 0.0140 wt. % $Na_2SeO_3$ is equivalent to and has the same amount of Se as 0.0056 wt. % metallic Se powder (this is taken into account in calculating the amount of Se retained in the final glass product).

glasses (i.e., samples) were then polished to the desired 4.09 mm thickness and spectral measurements above were taken with a Perkin Elmer spectrophotometer to determine the light transmittance in the wavelength range from 250 to 2,000 nm. The results are set forth in Table 3 above. It is noted that the "batch" herein can be put together prior to and/or during the melt itself. Thus, a component/material is said to be added to the batch regardless of whether it is added to the batch prior to melting or during melting.

Surprisingly, as can be seen in Table 3, the percentage (%) of Se retained in the final glass product is much higher than in the prior art. This is believed to be due to the use of Epsom salt(s) instead of or in addition to salt cake as a refining agent. In certain embodiments of this invention, at least about 30% of the original Se added to the batch is retained in the final glass composition, more preferably at least about 40% of the original Se added to the batch is retained in the final glass composition, and most preferably at least about 50% of the original Se added to the batch is retained in the final glass composition. Yet another surprising result illustrated in Table 3 above is that Se retention is improved when the Se is originally added to the batch in the form of $Na_2SeO_3$ (as opposed to metallic Se powder). For purposes of example referring to Table 3, in Example 1 the Se retention percentage (%) was calculated by taking the final amount of Se found to be in the resulting glass (i.e., 28 ppm) and dividing it by the original amount of Se in the glass batch (i.e., 60 ppm). Thus, 28/60=47% Se retention for

TABLE 3

Examples 1–13

| Material/Property | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|
| $Fe_2O_3$ (total iron) (rouge) | 1.4 | 1.8 | 1.4 | 1.8 | 1.6 | 1.8 | 1.8 | 1.8 | 1.6 | 1.2 | 1.25 | 1.6 | 1.25 |
| $TiO_2$ (titania) | 2.6 | 1.1 | 1.0 | 0.6 | 0.6 | 0.6 | 0.6 | 0.6 | 0.2 | 0 | 0.4 | 0.4 | 0.4 |
| $Cr_2O_3$ | 0 | 0 | 0 | 0 | 0 | 0 | 0 | 0 | 0 | 0.01 | 0 | 0 | 0 |
| $Co_3O_4$ | 0.024 | 0.024 | 0.023 | 0.023 | 0.0235 | 0.025 | 0.025 | 0.023 | 0.022 | 0.021 | 0.021 | 0.022 | 0.021 |
| Se (ppm) (metallic powder) | 60 | 60 | 0 | 0 | 0 | 0 | 0 | 60 | 0 | 0 | 0 | 0 | 0 |
| Se (ppm) ($Na_2SeO_3$) | 0 | 0 | 130 | 144 | 135 | 144 | 100 | 0 | 130 | 140 | 150 | 140 | 130 |
| $Na_2HPO_4$ | 0 | 0 | 0 | 1.0 | 0 | 1.0 | 0 | 0 | 0 | 0 | 1.0 | 0 | 0 |
| Epsom ($MgSO_4 \times 7H_2O$) | 0.9 | 0.9 | 0.3 | 0.5 | 0.3 | 0.5 | 0.3 | 0.5 | 0.6 | 0.6 | 0.6 | 0.3 | 0.6 |
| % Lta (in final product) | 19.0 | 13.4 | 18.87 | 15.81 | 15.45 | 14.9 | 14.1 | 19.7 | 17.03 | 20.0 | 20.7 | 14.75 | 20.6 |
| % IR (in final product) | 23.5 | 8.2 | 15.7 | 10.7 | 9.43 | 19.8 | 12.4 | 20.9 | 4.6 | 15.7 | 11.8 | 7.18 | 12.1 |
| % FeO (wt.) (final prod.) | 0.20 | 0.37 | 0.26 | 0.33 | 0.35 | 0.23 | 0.30 | 0.22 | 0.48 | 0.26 | 0.31 | 0.40 | 0.31 |
| a* (transmissive) | −3.6 | −5.3 | −4.1 | −4.8 | −3.78 | −1.9 | −6.4 | −4.2 | −7.0 | −3.44 | −5.0 | −3.7 | −4.6 |
| b* (transmissive) | +8 | +8 | +5.4 | +6.4 | +5.0 | +9.1 | +4.4 | +4.4 | −3.6 | +2.43 | +0.24 | +5.1 | +0.8 |
| Se retained in final (ppm) | 28 | 25 | 25 | 30 | 30 | 41 | n/a | 28 | 20 | 31 | 30 | 31 | n/a |
| Se retention % | 47% | 42% | 48% | 52% | 56% | 71% | n/a | 47% | 38% | 55% | 50% | 55% | n/a |

In manufacturing these example glasses referenced above, the base glass batch material together with the colorant portion was melted in a platinum (or alumina) crucible at 1500 degrees C. for about four hours, in a laboratory electric melting furnace. Thereafter, it was cast into graphite molds, and annealed at 620 degrees C. for half an hour, and then allowed to cool down to room temperature. The example Example 1. In a similar manner, for Example 10 the Se retention percentage (%) was calculated by taking the final amount of Se found to be in the resulting glass (i.e., 31 ppm) and dividing it by the original amount of Se in the glass batch (i.e., 56 ppm). The original amount of Se in the glass batch was calculated by multiplying 140 ppm $Na_2SeO_3$ by: (0.0056 Se/0.0140 $Na_2SeO_3$) [140×(0.0056/0.0140)=56 ppm Se in the original batch]. Thus, 31/56=55% Se retention in Example 10.

Certain of the aforesaid example glasses were then x-ray analyzed. For example, the final resulting Example 12 glass was x-ray analyzed and its composition was determined to be as follows (note: elements such as K, Al, Cr, and Ni were not intentionally added to the batch, but may be present nonetheless):

TABLE 4

COMPOSITION OF RESULTING EXAMPLE 12 GLASS (4 mm)

| Ingredient | wt. % (except as otherwise stated) |
|---|---|
| $SiO_2$ | 70.17% |
| $Na_2O$ | 13.709% |
| CaO | 9.404% |
| MgO | 4.075% |
| $Al_2O_3$ | 0.163% |
| $K_2O$ | 0.095% |
| $SO_3$ | 0.114% |
| $TiO_2$ | 0.413% |
| $Fe_2O_3$ (total iron) | 1.569% |
| cobalt oxide | 0.0218% |
| Se (ppm) | 31 ppm |
| $Cr_2O_3$ (ppm) | 10 ppm |
| NiO (ppm) | 6 ppm |

As can be seen in Table 4, amounts of chromium oxide and NiO were in the final product, although they were not intentionally added to the batch. Such amounts of chromium oxide, for example, may affect color in the final glass product.

Accordingly, the resulting glass composition (after melting, processing, etc.) in certain embodiments of this invention may include a base glass portion comprising:

| Ingredient | wt. % |
|---|---|
| $SiO_2$ | 67-75% |
| $Na_2O$ | 10-20% |
| CaO | 5-15% |
| MgO | 0-5% |
| $Al_2O_3$ | 0-5% |
| $K_2O$ | 0-5% |
| BaO | 0-1% | and a colorant portion comprising (or consisting essentially of in certain alternative embodiments):

| Ingredient | Preferred | More Preferred |
|---|---|---|
| Total iron (expressed as $Fe_2O_3$): | 1.0 to 2.2% (wt. %) | 1.2 to 1.8% |
| selenium (Se): | 10 to 50 ppm | 20-40 ppm |
| cobalt oxide: | 0.015 to 0.040% | 0.018 to 0.030% |
| titanium oxide: | 0 to 3.5% | 0.1 to 2.6% |
| chromium oxide: | 0 to 80 ppm | 5-20 ppm |

The terms, and characteristics, of ultraviolet light transmittance (% UV), infrared energy transmittance (% IR), dominant wavelength (DW) and excitation purity (i.e. % "purity", or Pe) are also well understood terms in the art, as are their measurement techniques. Such terms are used herein, in accordance with their well known meaning, e.g., see U.S. Pat. No. 5,308,805. IR transmittance is conventionally measured using Simpson's Rule and Parry Moon Air Mass=2 over the wavelength range 800–2100 nm inclusive at 50 nm intervals. Dominant wavelength (DW) is calculated and measured conventionally in accord with the aforesaid CIE Publication 15.2 (1986) and ASTM: E 308-90. The term "dominant wavelength" includes both the actual measured wavelength and, where applicable, its calculated complement. Excitation purity (Pe or % "purity") is measured conventionally in accordance with CIE Publication 15.2 (1986) and ASTM: E 308-90.

It is noted that according to different embodiments of this invention, glass compositions herein may be manufactured via single batch melting techniques, or alternatively via multiple pre-batch mixing techniques utilizing separate pre-batch mixes that are ultimately mixed together to make up a final overall batch mixture. For example, in the latter approach, one of the prebatch mixes could be made up of the iron-containing ingredient (e.g. rouge) along with optional reducing agents and some of the sand. The remaining batch ingredients can then be made up by admixing them in another separate prebatch mix or into two or more prebatch mixes before admixing them with the iron and reducing agent-containing first prebatch mix. After each separate prebatch mix is separately mixed, to form a substantially homogenous powdered admixture, the two or more prebatch mixes are mixed together to form the overall (or final) batch mixture. Conventional melting and refining techniques are then used to form a molten glass from which flat sheet glass or other articles may be formed.

In certain embodiments of this invention, the colorant portion is substantially free of copper oxide (e.g., CuO). However, in other embodiments of this invention, from about 0–500 ppm (more preferably from about 0–200 ppm) may be provided in the glass batch and/or resulting glass article. CuO, which acts a a reddish colorant in this regard, can be added in a manner so that the amount of Se needed can be reduced to a lower level.

Once given the above disclosure many other features, modifications and improvements will become apparent to the skilled artisan. Such features, modifications and improvements are therefore considered to be a part of this invention, the scope of which is to be determined by the following claims.

What is claimed is:

1. A method of making glass, the method comprising:

processing a molten glass batch including Se, including adding Epsom salt to the batch in an amount sufficient to reduce Se burnoff during melting and/or processing, in order to form a resulting glass product comprising $SiO_2$ and Se, so that the resulting glass product retains at least 30% of the Se originally present prior to melting.

2. The method of claim 1, wherein said processing is performed so that the resulting glass product retains at least 40% of the Se originally present prior to melting.

3. The method of claim 1, wherein said processing is performed so that the resulting glass product retains at least 50% of the Se originally present in the batch prior to melting.

4. The method of claim 1, wherein the Epsom salt comprises $MgSO_4 \times 7H_2O$.

5. The method of claim 1, further comprising adding the Epsom salt to the batch in an amount of from 0.1 to 2.0% by weight.

6. The method of claim 1, wherein said processing is performed so that the resulting glass product comprises a base glass portion comprising:

| Ingredient | wt. % |
| --- | --- |
| SiO$_2$ | 67–75% |
| Na$_2$O | 10–20% |
| CaO | 5–15% |
| MgO | 0–5% |
| Al$_2$O$_3$ | 0–5% |
| K$_2$O | 0–5% |
| BaO | 0–1% | and a colorant portion comprising:

| Ingredient | Amount |
| --- | --- |
| Total iron (expressed as Fe$_2$O$_3$): | 1.0 to 2.2% (wt. %) |
| selenium (Se): | 10 to 50 ppm |
| cobalt oxide: | 0.015 to 0.040% |
| titanium oxide: | 0 to 3.5% |
| chromium oxide: | 0 to 80 ppm. |

7. The method of claim 6, wherein the glass is grey in color and has a dominant wavelength in the range of from 435 nm to 570 nm.

8. The method of claim 6, further comprising adding from 30–90 ppm of Se metallic powder to the batch.

9. The method of claim 6, further comprising adding from 70 to 180 ppm of Na$_2$SeO$_3$ to the batch, so that at least a portion of the Se is added to the batch in the form of Na$_2$SeO$_3$.

10. The method of claim 6, wherein said processing is performed so that the resulting glass product includes a colorant portion comprising:

| Ingredient | Amount |
| --- | --- |
| Total iron (expressed as Fe$_2$O$_3$): | 1.2 to 1.8% (wt. %) |
| selenium (Se): | 20 to 40 ppm |
| cobalt oxide: | 0.018 to 0.030% |
| titanium oxide: | 0.1 to 2.6% |
| chromium oxide: | 5–20 ppm. |

11. The method of claim 1, wherein said processing is performed so that the resulting glass product includes a base glass portion comprising:

| Ingredient | wt. % |
| --- | --- |
| SiO$_2$ | 67–75% |
| Na$_2$O | 10–20% |
| CaO | 5–15% |
| MgO | 0–5% |
| Al$_2$O$_3$ | 0–5% |
| K$_2$O | 0–5% |
| BaO | 0–1% | and a colorant portion consisting essentially of:

| Ingredient | Amount |
| --- | --- |
| Total iron (expressed as Fe$_2$O$_3$): | 1.0 to 2.2% (wt. %) |
| selenium (Se): | 10 to 50 ppm |
| cobalt oxide: | 0.015 to 0.040% |
| titanium oxide: | 0 to 3.5% |
| chromium oxide: | 0 to 80 ppm. |

12. A method of making glass, the method comprising:
providing a glass batch including SiO$_2$, Fe$_2$O$_3$, Epsom salt, and an original amount of Se; and
forming a resulting glass product from the glass batch in a manner such that the resulting glass product includes at least 30% of the original amount of Se due at least to the presence of a sufficient quantity of the Epsom salt in the batch.

13. The method of claim 12, further comprising forming the resulting glass product in a manner such that the resulting glass product includes at least 40% of the original amount of Se.

14. The method of claim 13, further comprising forming the resulting glass product in a manner such that the resulting glass product includes at least 50% of the original amount of Se.

15. The method of claim 12, wherein the glass batch includes from 30–90 ppm Se and from 0.1 to 2.0% Epsom salt.

16. The method of claim 15, wherein the resulting glass product includes front 10–50 ppm Se.

17. The method of claim 12, wherein the Epsom salt comprises MgSO$_4$×7H$_2$O.

18. The method of claim 12, wherein said forming is performed so that the resulting glass product comprises a base glass portion comprising:

| Ingredient | wt. % |
| --- | --- |
| SiO$_2$ | 67–75% |
| Na$_2$O | 10–20% |
| CaO | 5–15% |
| MgO | 0–5% |
| Al$_2$O$_3$ | 0–5% |
| K$_2$O | 0–5% |
| BaO | 0–1% | and a colorant portion comprising:

| Ingredient | Amount |
| --- | --- |
| Total iron (expressed as Fe$_2$O$_3$): | 1.0 to 2.2% (wt. %) |
| selenium (Se): | 10 to 50 ppm |
| cobalt oxide: | 0.015 to 0.040% |
| titanium oxide: | 0 to 3.5% |
| chromium oxide: | 0 to 80 ppm |
| copper oxide: | 0 to 500 ppm. |

19. The method of claim 18, wherein the resulting glass product is substantially free of nickel (Ni) and manganese (Mn).

20. The method of claim 12, wherein the resulting glass product includes from 1.0 to 2.2% total iron (expressed as Fe$_2$O$_3$), and has a redox value FeO/Fe$_2$O$_3$ of from 0.20 to 0.30.

21. The method of claim 12, wherein the resulting glass product has an Lta (visible transmission, Ill. A, 2 degree observer) of from 10–30%, and an IR transmission percentage (%) of from 3–28%.

22. The method of claim 21, wherein the resulting glass product has a transmissive a* value (Ill. D65, 10 degree observer) of from 0.0 to −10.0, and a transmissive b* value (Ill. D65, 10 degree observer) of from −4.0 to +10.0.

23. A method of making a grey colored glass, the method comprising:

providing a molten glass batch comprising $SiO_2$, Se, and Epsom salt;

processing the glass batch in order to make a resulting grey colored glass product, the grey colored glass product including a base glass portion comprising:

| Ingredient | wt. % |
|---|---|
| $SiO_2$ | 67–75% |
| $Na_2O$ | 10–20% |
| CaO | 5–15% |
| MgO | 0–5% |
| $Al_2O_3$ | 0–5% |
| $K_2O$ | 0–5% |
| BaO | 0–1% | and a colorant portion comprising:

| Ingredient | Amount |
|---|---|
| Total iron (expressed as $Fe_2O_3$): | 1.0 to 2.2% (wt. %) |
| selenium (Se): | 10 to 50 ppm |
| cobalt oxide: | 0.015 to 0.040% |
| titanium oxide: | 0 to 3.5% |
| chromium oxide: | 0 to 80 ppm; | and wherein the Epsom salt is provided in the glass batch in sufficient quantity so that the resulting glass product retains at least 30% of the Se originally present in the batch.

24. The method of claim 23, wherein the Epsom salt is provided in the glass batch in sufficient quantity so that the resulting glass product retains at least 40% of the Se originally present in the batch.

25. The method of claim 24, wherein the Epsom salt is provided in the glass batch in an amount of from 0.1 to 2.0% by weight so that the resulting glass product retains at least 50% of the Se originally present in the batch.

* * * * *